US008934511B1

(12) United States Patent
Woodruff et al.

(10) Patent No.: US 8,934,511 B1
(45) Date of Patent: Jan. 13, 2015

(54) LASER INTERLOCK SYSTEM

(71) Applicants: Steven D. Woodruff, Morgantown, WV (US); Dustin L. Mcintyre, Washington, PA (US)

(72) Inventors: Steven D. Woodruff, Morgantown, WV (US); Dustin L. Mcintyre, Washington, PA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/023,822

(22) Filed: Sep. 11, 2013

(51) Int. Cl.
*H01S 3/00* (2006.01)
*H01S 3/10* (2006.01)

(52) U.S. Cl.
CPC .................................. *H01S 3/10* (2013.01)
USPC ......................... 372/38.09; 372/38.01

(58) Field of Classification Search
USPC ............................................. 372/38.09, 38.01
See application file for complete search history.

(56) References Cited

U.S. PATENT DOCUMENTS

| 5,154,707 | A | * | 10/1992 | Rink et al. | 606/12 |
| 7,723,638 | B2 | * | 5/2010 | Sukhman et al. | 219/121.6 |
| 2007/0253455 | A1 | * | 11/2007 | Stadler et al. | 372/38.09 |
| 2008/0050794 | A1 | * | 2/2008 | Koller et al. | 435/173.1 |
| 2010/0004794 | A1 | * | 1/2010 | Ziemkowski et al. | 700/297 |
| 2012/0120973 | A1 | * | 5/2012 | Ziemkowski et al. | 372/29.02 |

* cited by examiner

*Primary Examiner* — Xinning Niu
*Assistant Examiner* — Vu A Vu
(74) *Attorney, Agent, or Firm* — Michael J. Dobbs; Daniel Park; John T. Lucas

(57) ABSTRACT

A method and device for providing a laser interlock having a first optical source, a first beam splitter, a second optical source, a detector, an interlock control system, and a means for producing dangerous optical energy. The first beam splitter is optically connected to the first optical source, the first detector and the second optical source. The detector is connected to the interlock control system. The interlock control system is connected to the means for producing dangerous optical energy and configured to terminate its optical energy production upon the detection of optical energy at the detector from the second optical source below a predetermined detector threshold. The second optical source produces an optical energy in response to optical energy from the first optical source. The optical energy from the second optical source has a different wavelength, polarization, modulation or combination thereof from the optical energy of the first optical source.

18 Claims, 10 Drawing Sheets

LASER INTERLOCK SYSTEM

GOVERNMENT INTERESTS

The United States Government has rights in this invention pursuant to the employer/employee relationship between the inventors and the U.S. Department of Energy, operators of the National Energy Technology Laboratory (NETL).

FIELD OF THE INVENTION

The present invention relates to a laser interlock system, preferably for the safe discontinuance of optical energy when a high-power laser is moved or disconnected from its designated location.

BACKGROUND OF THE INVENTION

There has been significant progress in the production of high-intensity optical energy, for example in the area of laser spark plugs or cutting technology and laser-based missile defense. However, there has been little effort to protect users of such systems from accidental exposure to such high-intensity optical energy that may blind or otherwise severely injure anyone exposed to such optical energy without proper protection.

Typically, high-intensity optical energy systems use a simple case switch, which is a simple electrical switch that is opened or closed when a casing is opened. However, in some systems it may be difficult or impractical to have a case switch to indicate when an outer casing is removed. For example, for laser spark plugs, providing a casing around each plug would be impractical and lead to spacing issues, heat issues etc. Furthermore, such a sensor does little to follow the path of optical energy from the source. For example, unlike electricity, simple cuts in an optical fiber covering may do more than just cause disconnections or electrical shorts, but may leak dangerous amounts of high-intensity optical energy. Such high-intensity leaks may be particularly dangerous as they may be undetectable in current designs until damage or injury occurs.

SUMMARY OF THE INVENTION

A method and device for providing a laser interlock having a first optical source, a first beam splitter, a second optical source, a detector, an interlock control system, and a means for producing dangerous optical energy within a first protected output. The means for producing dangerous optical energy within a first protected output and the second optical source are positioned within the first protected output. The first beam splitter is optically connected to the first optical source, the first detector and the second optical source. The detector is connected to the interlock control system. The interlock control system is connected to the means for producing dangerous optical energy and configured to terminate optical energy production by the means for producing dangerous optical energy upon the detection of optical energy at the detector from the second optical source below a predetermined detector threshold.

The second optical source produces an optical energy in response to optical energy from the first optical source. The optical energy from the second optical source has a different wavelength, polarization, modulation or combination thereof from the optical energy of the first optical source. Preferably, the optical energy from the second optical source has a different wavelength, polarization, modulation or combination thereof from the optical energy of the means for producing dangerous optical energy.

DETAILED DESCRIPTION OF THE INVENTION

Figure 1:
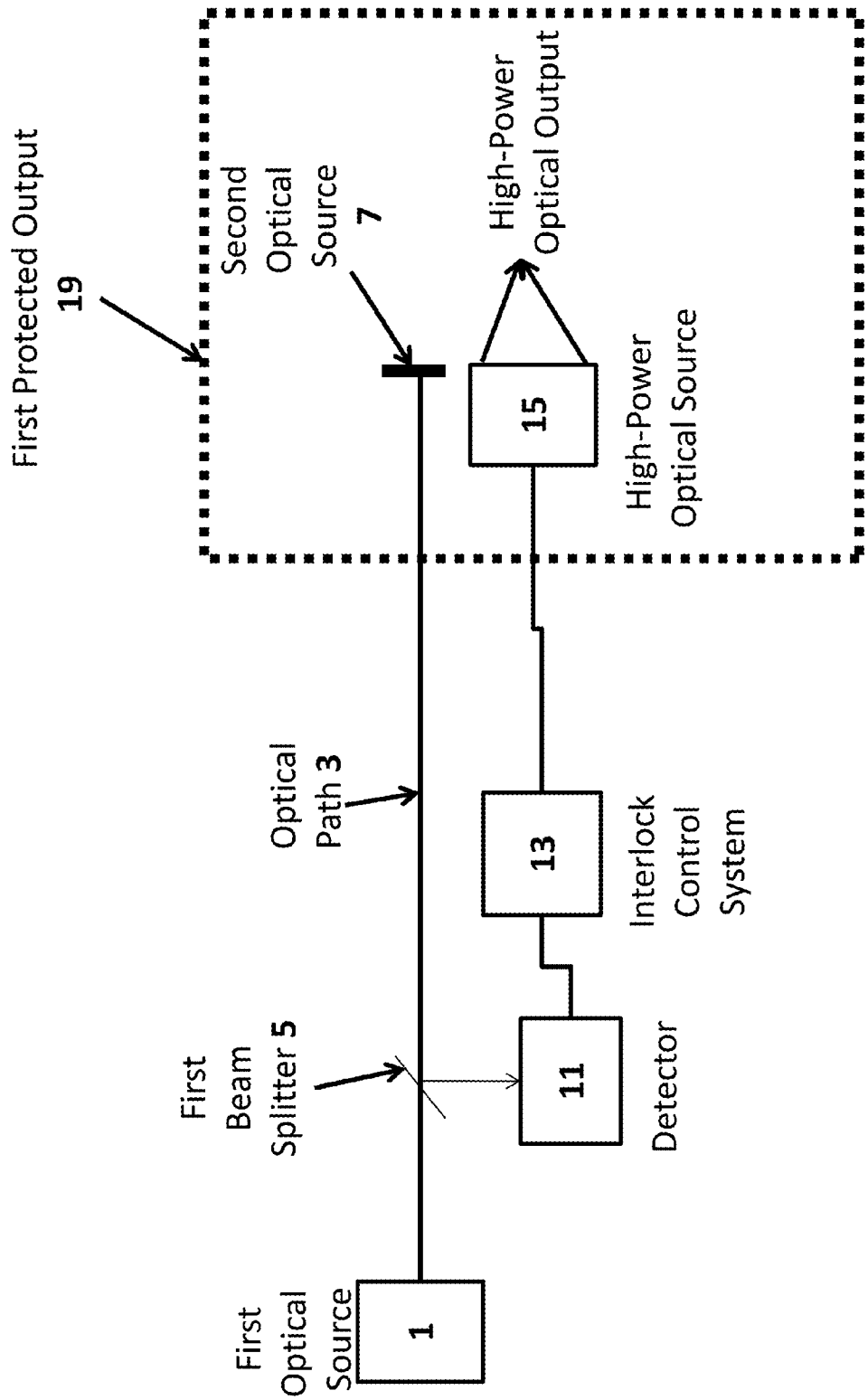
FIG. 1 depicts a general overview of one embodiment of a laser interlock system.

A method and device for providing a laser interlock having a first optical source, a first beam splitter, a second optical source, a detector, an interlock control system, and a means for producing dangerous optical energy. The first beam splitter is optically connected to the first optical source, the first detector and the second optical source. The detector is connected to the interlock control system. The interlock control system is connected to the means for producing dangerous optical energy and configured to terminate optical energy production by the means for producing dangerous optical energy upon the detection of optical energy at the detector from the second optical source below a predetermined detector threshold.

The second optical source produces an optical energy in response to optical energy from the first optical source. The optical energy from the second optical source has a different wavelength, polarization, modulation or combination thereof from the optical energy of the first optical source. Preferably, the optical energy from the second optical source has a different wavelength, polarization, modulation or combination thereof from the optical energy of the means for producing dangerous optical energy.

In one embodiment, a first filter is optically connected to and optically positioned between the first beam splitter and the detector, whereby all optical energy reaching the detector must pass through the first filter. The first filter is substantially opaque to optical energy from the first optical source, substantially translucent to the optical energy of said second optical source, and preferably substantially opaque to optical energy from the means for producing dangerous optical energy.

In one embodiment, the first optical source provides an optical energy at a first polarization and the second optical source rotates the optical energy to a second polarization and reflects it back to the first beam splitter. This embodiment uses a first filter optically connected to and optically positioned between the first beam splitter and the detector, whereby all optical energy reaching the detector must pass through the first filter. The first filter is substantially opaque to optical energy at the first polarization and preferably also substantially opaque to optical energy having a wavelength different from the first optical source. The first filter is substantially translucent to optical energy at the polarization and wavelength of the second optical source.

In yet another embodiment, the first optical source provides an optical energy at a first wavelength and the second optical source is made of a material which emits optical energy in response to optical energy from the first optical source at a second wavelength, which is different from the first wavelength. This embodiment preferably uses a first filter optically connected to and optically positioned between the first beam splitter and the detector, whereby all optical energy reaching the detector must pass through the first filter. The first filter is substantially opaque to the first wavelength and preferably also substantially opaque to optical energy that is not substantially at the second wavelength. The first filter is substantially translucent to optical energy at the second wavelength. In the alternative, the detector, interlock control system, or a combination thereof is used to determine the optical energy at the detector from the second optical source.

In yet another embodiment, the second optical source produces a modulated optical energy in response to the optical energy from the first optical source. In this embodiment, the first filter may be omitted at the detector, the interlock control system or a combination thereof is preferably designed to detect the modulated optical energy.

Preferably, the second optical source is built into an optical window for the means for producing dangerous optical energy. In this embodiment, the means for producing dangerous optical energy is fixed to a first section, for example, but not limited to, a spark plug device and the optical window is fixed to a second structure, for example, but not limited to, the cylinder head of an engine. Therefore, in this embodiment, when the first structure is disconnected from the second structure, the interlock will disable the means for producing dangerous optical energy, thereby preventing the risk of injury to those in the area.

As used herein, the term "optically connected" shall refer to any means of optically transferring between either directly or through any number of intermediate components. For example, but not limited to, optically connected may refer to a direct connection or an indirect connection whereby the optical energy must first pass through a number of optical components before it reaches its final destination. In a preferred embodiment, the optical connection includes, but is not limited to, one or more optical fibers, air, free space, other optically translucent materials, or combinations thereof.

As used herein, the term "translucent" shall mean capable of transmitting optical energy through the material, which may or may not include reflections or scattering.

As used herein, the term "substantially blocking" or "substantially opaque" shall mean providing attenuation of optical energy whereby one skilled in the art would consider the optical energy blocked for purpose of optical transmission. In preferred embodiments, the term "substantially blocking" or "substantially opaque" includes attenuations of at least 50%, 60%, 70%, 80%, 90%, 95% or 99%.

As used herein, the term "substantially allowing" or "substantially translucent" shall mean providing a transmission of optical energy whereby one skilled in the art would consider the optical energy as having passed through for purpose of optical transmission. In preferred embodiments, the term "substantially allowing" or "substantially translucent" includes transmissions of at least 50%, 60%, 70%, 80%, 90%, 95% or 99%.

First Optical Source

The first optical source has a different wavelength, polarization, modulation, or combination thereof than the second optical source. The first optical source produces a first optical energy along the optical path. The first optical source preferably produces an optical energy having low peak power, preferably less than 10 Watts, more preferably less than about 1 Watt. Preferably, the optical energy is a continuous stream. In the alternative, the optical energy produced by the first optical source is a periodic pulse or a modulation. Preferably, the modulation is a coded train of pulses, more preferably AM, FM, Binary Code, Morse Code, FSK, Transmission of a particular GO code. In one embodiment, a coded train of pulses is used to preferentially select a particular second source in a distributed arrangement. In the preferred embodiment, the first optical source is a laser diode, preferably providing a continuous optical energy that is detected by the detector.

First Beam Splitter

The first beam splitter is any device which is capable of at least partially reflecting optical emission of the second optical source to the detector, and if present, through the first wavelength filter. Preferably, the first beam splitter is a reflector orientated to transmit at least a portion of the optical emission of the first optical source to the second optical source.

Preferably, the first beam splitter is made of an optical substrate. The first beam splitter preferably comprises a thin glass slide or a partially reflecting dielectric thin film coating on an optical substrate. Partially reflecting thin film coatings are preferably made of Aluminum, Silver, Gold, Silicon, Titanium, Tantalum, Zirconium, Hafnium, Scandium, Niobium, oxides thereof, fluorides thereof or combinations thereof. More preferably, the coatings preferably comprise materials with various indices of refraction for example, but not limited to, as $Al_2O_3$, $Al_2O$, $Ta_2O_5$, $SiO_2$, $TiO_2$, $CaF_2$, $ZrO_2$, $BeO_2$, $MgF_2$, $LaF_3Nb_2O_5$, $HfO_2$, and $AlF_3$ or combinations thereof.

In a preferred embodiment, the first beam splitter is made of fused silica with thin films deposited on the secondary downstream face to tune the operating wavelength and the reflectivity and an anti-reflection coating on the primary upstream face to improve transmission and reduce undesirable optical effects such as additional off-axis reflections and ghosting of the primary optical signal. The partially reflecting thin film is preferably constituted primarily of alternating layers of low index of refraction materials whose presence or absence can be used to tune the reflectivity and the center wavelength to the desired area of operation. The thin films are preferably made up of Aluminum, Silver, Gold, or oxides of silicon, titanium, tantalum, zirconium, hafnium, scandium, niobium or combinations thereof. The anti-reflection coatings preferably comprise a thin film of magnesium fluoride.

First Filter

If used, the first wavelength filter is substantially opaque to, and therefore blocks, optical energy having a wavelength, polarization, modulation or combination thereof different from the second optical source. Preferably, the first filter also substantially blocks optical energy from the high-energy optical source.

In one embodiment, the first filter substantially blocks optical energy at the polarization of the optical energy of the first optical source and substantially allows the passage of optical energy at the polarization and wavelength of the second optical source. In another embodiment, the first filter substantially blocks optical energy at the wavelength of the optical energy of the first optical source and substantially translucent allows the passage of optical energy at the wavelength of the second optical source.

Preferably, the first filter is made of glass with various inorganic or organic compounds added to create translucent and opaque properties described herein. In the alternative, various compounds are added to plastic to produce a filter with the correct translucent and opaque properties described herein. Preferably, the first filter is made of a series of very thin metallic wires (wire-grid polarizer). In one embodiment the first filter is a thin film polarizer, preferably made from a thin glass substrate with an optical coating to induce the proper effect. In yet another embodiment the first filter is an absorption polarization filter having specific compounds in a matrix, glass or plastic, that interacts with the photons to absorb those of the undesired polarization.

Second Optical Source

The second optical source receives optical energy from the first optical source and in response, generates a second optical energy having a different wavelength, polarization, or combination thereof from the optical energy of the first optical source. In one embodiment, the second optical source rotates the optical energy at a second polarization and reflects it back to the first beam splitter. In yet another embodiment, the second optical source is made of a material which emits optical energy in response to optical energy from the first optical source having a different wavelength, polarization, modulation or combination thereof. Preferably, the second optical source is made of a material which emits optical energy in response to optical energy from the first optical source at a second wavelength, which is different from the wavelength of the optical energy of the first optical source.

Optical Path

The optical path is the path of optical energy from the first optical source to the second optical source. The path of optical energy from the first optical source may take any path. In various embodiments, the optical path comprises one or more mirrors, optical fibers, lenses, other optical devices, or any combination thereof. For example, but not limited to, in one embodiment, the optical path incorporates one or more optical fibers, whereby the path may include various bends and turns at any angle. In another embodiment, the optical path includes one or more mirrors or other means of reflecting thereby allowing for various optical paths as desired.

Detector

The detector is a device that is capable of detecting optical emissions of the second optical source. Preferably, the detector is a photomultiplier, a phototransistor, a photoresistor or a photodiode with the necessary electronics to connect to the interlock control system. Preferably, the system is designed to account for any optical energy that is not from the first optical source, for example, but not limited to, by setting a threshold value for intensity of optical energy reaching the detector before the emission of the first optical source is considered as detected.

In one embodiment, a resistor with a known resistance and a photo resistor are connected in series across a voltage source. In another embodiment, one or more voltage comparators, Analog-to-digital converters (ADC), transistors, amplifiers, or a combination thereof are used to connect the detector to the interlock control system. For example, but not limited to, in one embodiment, the output of the photodiode is electrically connected to the input of a current-to-voltage amplifier circuit.

In another embodiment, a photodiode is electrically connected to a voltage source in reverse bias with a current detector, whereby a change in current is related to a change in optical energy intensity detected.

For embodiments using a first filter, as the first filter is substantially opaque to optical energy from the first optical source, optical energy reaching the detector will be substantially transmitted, preferably entirely, from the second optical source.

In the alternative, the first filter may be omitted. In this embodiment, the detector, interlock control system, or a combination thereof is designed to isolate the optical energy from the second optical source.

Interlock Control System

The interlock control system is connected to the means for producing dangerous optical energy and configured to terminate optical energy production of the means for producing dangerous optical energy upon the detection of optical energy at the detector from the second optical source below a predetermined detector threshold. The interlock control system receives a signal from the detector relating to the presence of optical energy at the detector. Preferably, the signal relates to the amount of optical energy detected. In an alternate embodiment using a first filter to filter out all optical energy except for the optical energy from the second optical source, the detector provides only whether or not optical energy is detected, whereby the predetermined detector threshold is the detection capability of the detector configuration.

Preferably, the interlock control system receives a signal related to the amount of optical energy at the detector. In one embodiment, the interlock control system receives an analog signal from the detector, for example, but not limited to, based on voltage, current, frequency, or a combination thereof. In another embodiment, the interlock control system receives a digital signal from the detector, for example, but not limited to, a serial, parallel connection, a data bus, or a combination thereof. In one embodiment, the interlock control system is configured to determine a value relating to the amount of optical energy at the detector from the signal received by the detector. The interlock control system will then determine whether or not the determined value is below a predetermined detector threshold. The interlock control system anticipates an optical energy is coming from the second source which is transformed into an electrical signal by the detector. The loss of said signal indicates a breakage or disruption and the interlock control system terminates the operation of the means for producing dangerous optical energy.

Preferably, the predetermined detector threshold is optimized for the detector design, first optical source, first filter, polarization second optical source, any other attenuation of the optical energy within the system, or a combination thereof. Preferably, the predetermined detector threshold is optimized at design. In one embodiment, the predetermined detector threshold is selected or adjusted after production, preferably through a user interface.

For embodiments omitting the first filter, the detector, interlock control system, or a combination thereof is designed to isolate the optical energy from the second optical source. Preferably, the optical energy form the second optical source is isolated by computing analysis, such as software based filtering, Fourier transformations, or other analytical methods of isolating the optical energy of the second optical source.

The interlock control system is connected to the means for producing dangerous optical energy and is configured to control the operation of the means for producing dangerous optical energy. In one embodiment, the interlock control system is configured to control the power of the means for producing dangerous optical energy, for example, but not limited to, through a relay or a power control signal. In an alternate embodiment, the interlock control system is a part of a larger control system that is capable of disabling the output of the means for producing dangerous optical energy, preferably including any number of properties of the means for producing dangerous optical energy, for example, but not limited to, power, wavelength, modulation, pulse width, pulses per second, and combinations thereof.

The interlock control system is any device capable of reading the output signal from the detector and controlling the operation of the means for producing dangerous optical energy. The interlock control system preferably comprises a processor, computer, application specific integrated controller (ASIC), microcontroller, CPU, or a combination thereof. In one embodiment the interlock control system is an AMEGA128 as sold by ATMEL CORPORATION.

Means for Producing Dangerous Optical Energy

The means for producing dangerous optical energy is any means for producing optical energy having a higher peak, average, or a combination thereof power than the first optical source, preferably exceeding physiological damage thresholds. Preferably, the means for producing dangerous optical energy is any means for producing energy that may cause harm to unprotected humans, animals or other life forms, electrical components or surrounding materials.

Figure 9:
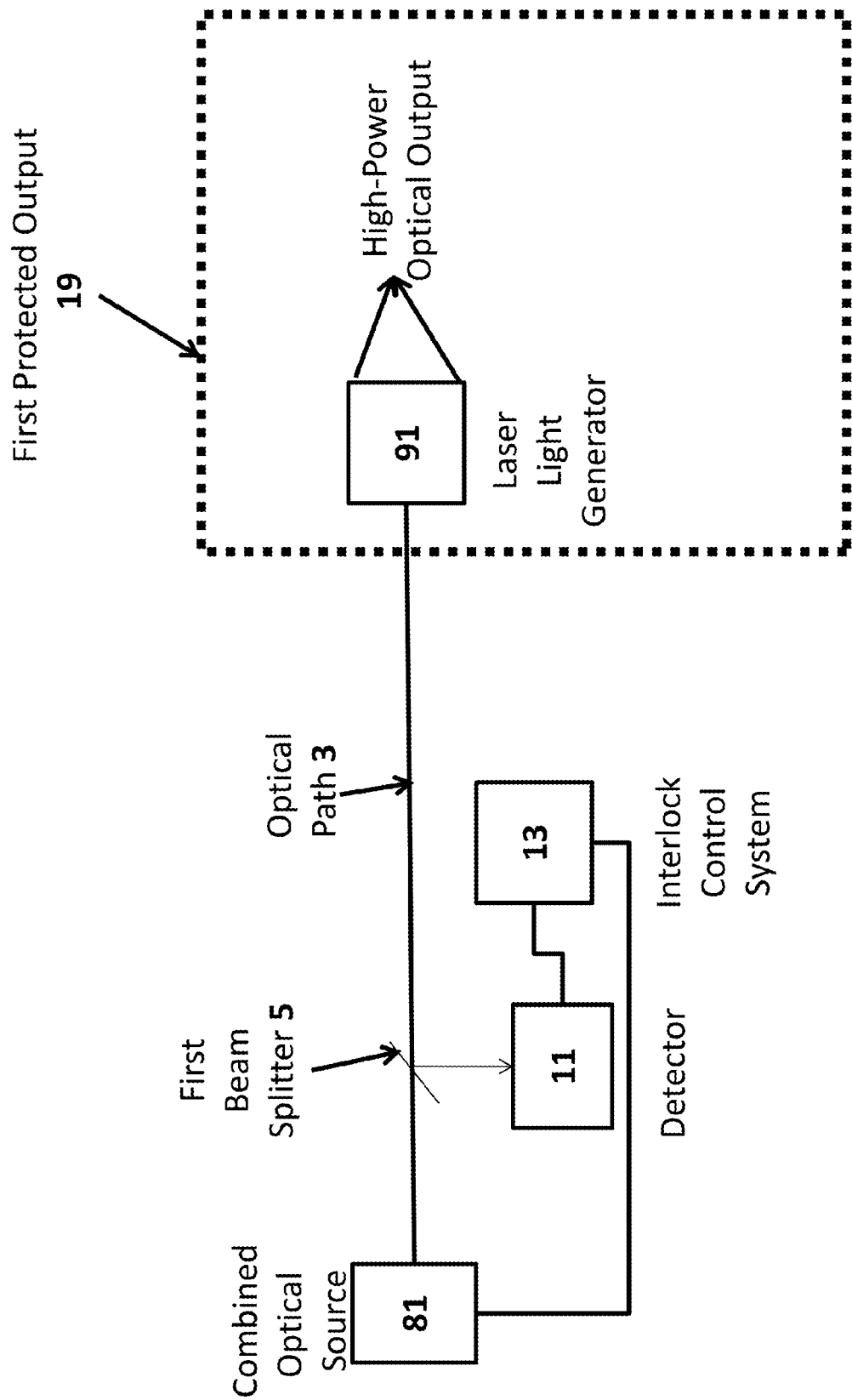
FIG. 9 depicts a general overview of one embodiment of a laser interlock system having a single optical source operating as a first optical source for monitoring and also as a pumping source for a laser media, and a Laser Light Generator serving as both the second optical source and the high-power optical output.

Preferably, the means for producing dangerous optical energy is a high-power optical source. In yet another embodiment, for example as shown in FIG. 9, the means for producing dangerous optical energy is a Laser Light Generator configured to act as both the second optical source, providing optical energy towards the detector in response to optical energy from the first optical source, as well as provide a dangerous optical energy in response to pumping provided by optical energy from the first optical source. The system is design whereby the detector will not be confused by optical energy produced by the means for producing dangerous optical energy or any other optical energy produced during normal operations. For example, in one preferred embodiment, the means for producing dangerous optical energy operates at a different wavelength, polarity, modulation, or a combination thereof than light produced by the second optical source.

In another embodiment, the means for producing dangerous optical energy is a high-power optical source, preferably a Q-switched Nd:YAG laser and the first optical source is a modulated Nd:YAG laser that the detector, interlock control system, or a combination thereof can differentiate from the optical energy produced by the second optical source.

Preferably, the means for producing dangerous optical energy is a laser spark plug, more preferably a Q-switched spark plug. In one embodiment, the means for producing dangerous optical energy is a passive Q-switched laser sparkplug. In an alternate embodiment, the means for producing dangerous optical energy is an actively switched Q-switched laser sparkplug. In an alternate embodiment, the means for producing dangerous optical energy is a fiber coupled pump source for a laser spark plug which can be either actively or passively Q-switched. Preferably, the laser sparkplug is pumped with optical energy from one or more flashlamp, VCSEL (vertical-cavity surface-emitting laser) pumps, side pumping diodes, diodes in any location, or combinations thereof. In an alternate embodiment, the means for producing dangerous optical energy is continuous wave high-powered laser used for cutting, welding, or etching solid materials such as paper, leather, cloth, glass, metal, wood, plastic, or such material needing to be cut, welded, or etched.

Preferably, the means for producing dangerous optical energy has a wavelength, polarity, modulation or a combination thereof to prevent interference with the interlock system. For embodiments using a polarization reflector, the means for producing dangerous optical energy is preferably a different wavelength that is blocked by the first filter or the same wavelength at the polarization of the first optical source. In yet another embodiment whereby the second optical source is a fluorescent material, the means for producing dangerous optical energy emits optical energy at a wavelength different than the wavelength of the optical energy produced by the second optical source.

Pluralities

In various embodiments a plurality of second optical sources may be employed. Preferably, the first optical source, first beam splitter, optical path, detector, interlock control system, means for producing dangerous optical energy, or a combination thereof may be reused providing functionality to a plurality of second optical sources. For example, in one embodiment, a single means for producing dangerous optical energy is protected with a plurality of second optical sources, that may or may not reuse the other various components.

In a preferred embodiment, for example, but not limited to, as described below, a single first optical source, first beam splitter, optical path, detector, interlock control system, means for producing dangerous optical energy are all used to provide interlock monitoring as described herein of multiple second optical sources. In this embodiment, the second optical source produces a modulated response unique form the other modulated responses of the second optical source. Therefore, the detector, interlock control system, or a combination thereof may determine the second optical source producing the optical energy received at the detector and detect a disconnect thereby disabling the appropriate means for producing dangerous optical energy.

FIG. 1

FIG. 1 depicts a general overview of one embodiment of a laser interlock system having a first optical source 1, an optical path 3, a first beam splitter 5, a second optical source 7, a detector 11, an interlock control system 13, a high-power optical source 15, and a first protected output 19. The first optical source 1, optical path 3, first beam splitter 5, second optical source 7, detector 11, interlock control system 13, high-power optical source 15 are as described above.

As shown in FIG. 1 and described above, the first optical source 1 produces an optical energy along the optical path 3. The first beam splitter 5 passes a portion of optical energy from the first optical source 1 to the second optical source 7 and reflects a portion of optical energy from the first optical source 1 away from the detector 11.

Optical energy from the first optical source 1 passing through the first beam splitter 5 to the second optical source 7 creates an optical response resulting in the optical energy from the second optical source 7 being transmitted back towards the first beam splitter 5. A portion of the optical energy from the second optical source 7, having reflected from the first beam splitter 5, will substantially pass to the detector 11. The interlock control system 13 detects the presence of optical energy from the second optical source 7 at detector 11. If the interlock control system 13 detects a lack of optical energy at the detector 11 from the second optical source 7, indicating the optical path 3 has been interrupted, the operation of the high-power optical source 15 is terminated. If the interlock control system 13 detects optical energy at the detector 11 from the second optical source 7, indicating the optical path 3 is intact; the operation of the high-power optical source 15 is allowed to proceed as desired.

Preferably, the interlock control system 13 is connected to the detector 11 and the high-power optical source 15 via one or more wires. A wire is any electrically conductive means. In one embodiment, the interlock control system 13 is connected to the detector 11 and the high-power optical source 15 via a common bus, preferably wired, but in the alternative wireless.

Therefore, if the optical path 3 between the first optical source 1, first beam splitter 5, second optical source 7, or any combination thereof is blocked or otherwise attenuated, the interlock control system 13 will terminate operation of the high-power optical source 15 upon the detection of optical energy at the detector 11 below the predetermined detector threshold.

Optical Path 3

The optical path 3 is the path of optical energy from the first optical source 1 to the second optical source 7. Although the optical path 3 is depicted as a linear path, the path of optical energy from the first optical source 1 may take any path. In various embodiments, the optical path 3 comprises one or more mirrors, optical fibers, lenses, other optical devices, or any combination thereof. For example, but not limited to, in one embodiment, the optical path 3 incorporates one or more optical fibers, whereby the path may include various bends and turns at any angle. In another embodiment, the optical path 3 includes one or more mirrors or other means of reflecting thereby allowing for various optical paths as desired.

The First Protected Output 19

The first protected output 19 includes the second optical source 7 and the high-power optical source 15. Although only one first protected output 19 is shown in FIG. 1, any number of protected outputs may be used. In one embodiment, the first protected output 19 also includes the first optical source 1, the first beam splitter 5, the optical path 3, the detector 11, the interlock system 13, or a combination thereof.

FIG. 2

Figure 2:
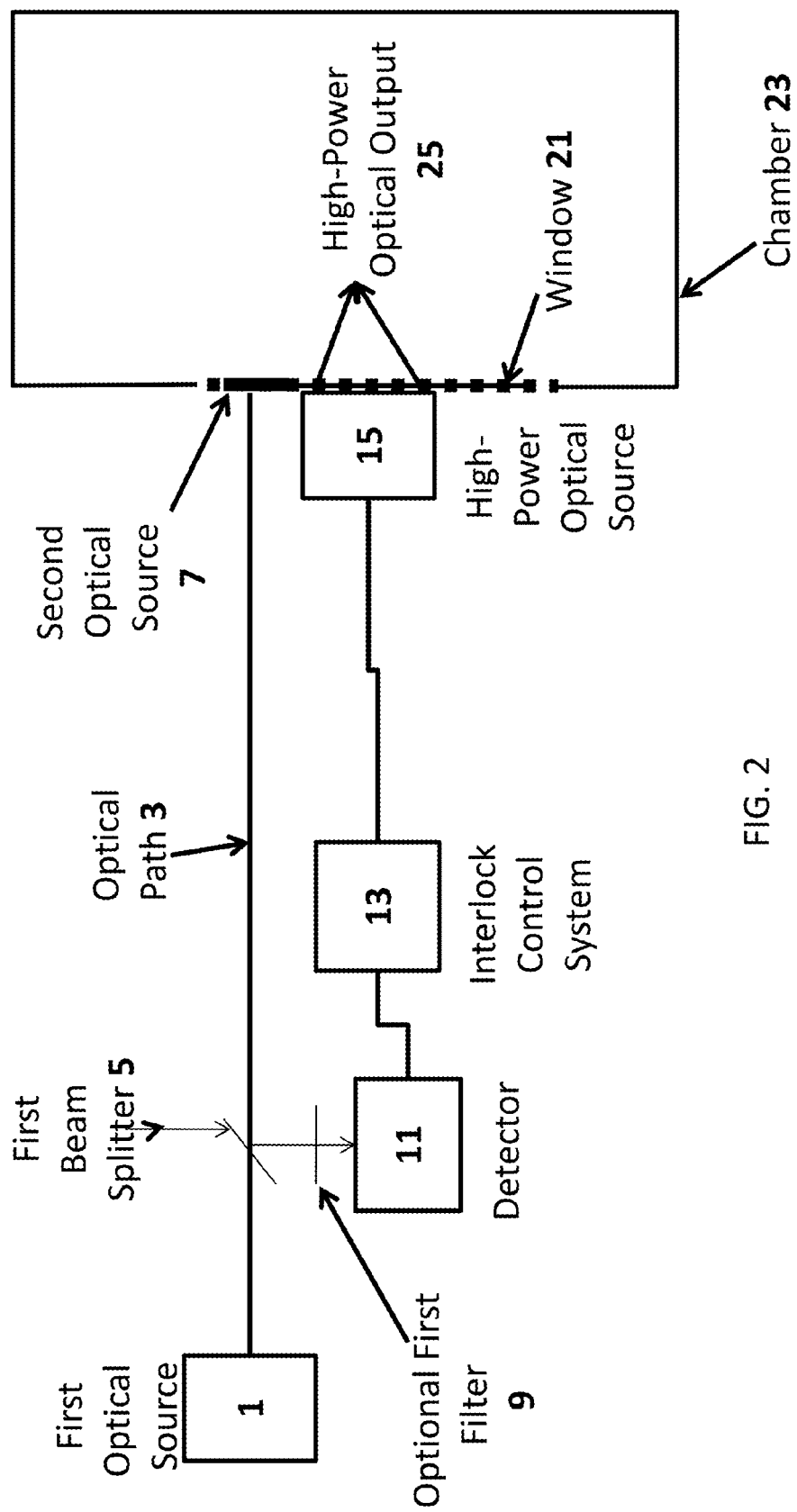
FIG. 2 depicts an overview of one embodiment of a laser interlock system including an optical window.

FIG. 2 depicts a general overview of one embodiment of a laser interlock system including an optical window having a first optical source 1, an optical path 3, a first beam splitter 5, a second optical source 7, a first filter 9, a detector 11, an interlock control system 13, a high-power optical source 15, an optical window 21 and a reaction chamber 23. The first optical source 1, optical path 3, first beam splitter 5, second optical source 7, detector 11, interlock control system 13, and high-power optical source 15 are as described above.

The First Filter 9

The first filter 9, as described above, is positioned between the first beam splitter 5 and the detector 11. All optical energy passing to the detector 11 is preferably passed through the first filter 9. The first filter 9 is made of a material which substantially blocks the optical energy of the first optical source 1 from passing to the detector 11, while substantially allowing optical energy from the second optical source 7 to pass through. In this embodiment, a portion of the optical energy from the second optical source 7, having reflected from the first beam splitter 5, will substantially pass through the first filter 9 to the detector 11. Therefore, optical energy reaching the detector 11 is substantially from the second optical source 7. In the alternative, the first filter 9 may be omitted, for example, but not limited to, when the response of the second optical source 7 is modulated or otherwise distinguishable by the detector 11, interlock control system 13 or a combination thereof.

Optical Window 21

The embodiment shown in FIG. 2 also has an optical window 21 connected to the second optical source 7 and the high-power optical source 15. In one embodiment, the optical window 21 also serves as a lens. This embodiment is preferred for systems having the high-power optical output 25 of the high-power optical source 15 directed within a reaction chamber 23, for example, but not limited to, a laser spark plug directed into a combustion cylinder. In this embodiment, the second optical source 7 is preferably a film on the surface of the optical window, preferably by etching or otherwise an integral part of the optical window 21 or near the portion of the optical window 21 where the high power source output passes, preferably embedded beside or otherwise near the optical window 21. In the alternative, the optical window 21 comprises a portion that is made of a material that acts as the second optical source 7 as described above. This embodiment preferably comprises a means for separating the high-power optical source 15 from the optical window 21, whereby upon separation, the second optical source 7 is also separated from the first optical source 1 thereby activating the interlock as described above.

FIG. 3

Figure 3:
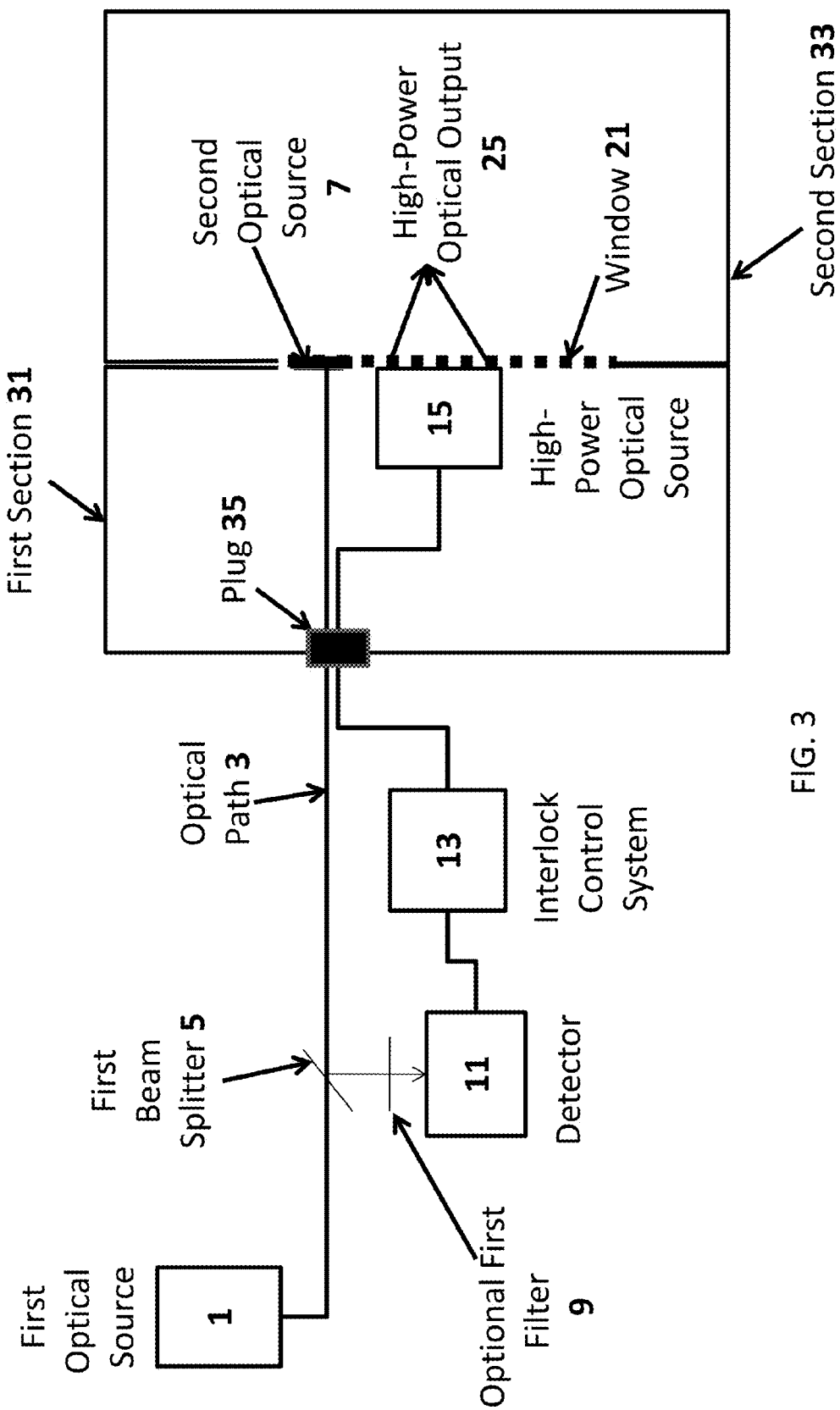
FIG. 3 depicts a general overview of one embodiment of a laser interlock system including a first and second section.

FIG. 3 depicts a general overview of one embodiment of a laser interlock system including a plug having a first optical source 1, an optical path 3, a first beam splitter 5, a second optical source 7, a first filter 9, a detector 11, an interlock control system 13, a high-power optical source 15, an optical window 21, a first section 31 a second section 33, and a plug 35. The first optical source 1, optical path 3, first beam splitter 5, second optical source 7, first filter 9, detector 11, interlock control system 13, high-power optical source 15, and optical window 21 are as described above.

First Section 31

The first section 31 holds at least the high-power optical source 15. In various embodiments, other components may also be positioned within the first section 31. Preferably, a plug 35 is used to at least allow for the passage of the optical path 3 to the second optical source 7, as well as any connections between the interlock control system 13 and the high-power optical source 15. In a preferred embodiment, the first section 31 is the chassis of a laser spark plug.

Second Section 33

The second section 33 holds at least the second optical source 7. In various embodiments, other components may also be positioned within the second section 33. Preferably, the second section 33 also includes the optical window 21, whereby the second section 33 forms a sealed chamber, preferably for use in a laser spark plug, or other closed area. Preferably, the second section 33 is properly sealed to contain the output of the high-power optical source 15.

The first section 31 and the second connection 33 are preferably removably fastened to each other in a manner allowing for separation during repair, preferably via a screwed, latched, bolted, tied, nailed, otherwise fastening means, or a combination thereof.

Plug 35

The plug 35 is preferably used to at least allow for the passage of the optical path 3 within the first section 31 and eventually to the second optical source 7, as well as any connections between the interlock control system 13 and the high-power optical source 15. In a more preferred embodiment, the plug 35 provides a means for connecting and disconnecting the various connections passing into and out of the first section 31. The plug 35 is used at least to allow optical energy from the first optical source 1 to pass to the second optical source 7 and the interlock control system 13 to connect to the high-power optical source 15. In this embodiment, if the first optical source 1 is disconnected at the plug 35, the interlock system will activate as described above, thereby terminating the high-power optical source 15. This embodiment is preferable as it allows for a quick means of connecting. This embodiment is even more preferred for systems having a high-power optical output directed within a chamber, for example, but not limited to, a laser spark plug.

Design Advantages

The use of a first section 31 with the second section 35 is particularly advantageous for various reasons, for example, but not limited to, it allows for the device to be separated, for example, but not limited to, during repairs or during regular use, while providing enhanced safety.

For example, but not limited to, during normal operation, when the first section 31 is connected to the second section 33, the output of the high-power optical source 15 will be preferably contained by the second section 33.

If the first section 31 is separated from the second section 33, the interlock system 13 will detect a lack of optical energy from the second optical source 7 at the detector 11, as described above, and disable the high-power optical source 15. This is particularly important as the output of the high-power optical source 15 would be otherwise uncontained. The system is advantageous over an electrical system using switches as it uses the above discussed optical detection means, which closely matches the optical coupling of the high-power optical source 15. Therefore, the system is able to not only detect a complete separation of the first section 31 and the second section 33, but an improper coupling for example, but not limited to, by the sections being shifted slightly or being separated by a relatively small gap, which would be difficult to detect using non-optical connections while emitting dangerous optical energy from the high-power optical source 15.

Furthermore, one embodiment of the above described system is also resistant against failures caused by degradation of the optical window 21 due to stresses caused by wear and tear or unexpected stresses due to explosions, reactions etc. If the optical window 21 were to deteriorate the second optical source 7 would also deteriorate and at least reflect significantly less of the optical energy from the first optical source 1 that can be detected by the detector 11. Therefore, it is also preferred that the second optical source 7 is a film on the optical window 21, whereby any damage to the optical window would also likely affect the performance of the second optical source 7.

The configuration is particularly beneficial as if any of the optical energy passing through the optical path 3 is blocked or otherwise attenuated, for example, but not limited to, by a breaking of an optical fiber, the interlock system 13 will detect a lack of optical energy at the detector 11, as described above, and disable the high-power optical source 15. Therefore, a plug 35 is preferably used to at least allow for the passage of the optical path 3 to the second optical source 7, as well as any connections between the interlock control system 13 and the high-power optical source 15. In a preferred embodiment, the first section 31 is the chassis of a laser spark plug.

Furthermore, if the plug 35 or any other device includes a preferable disconnect/connect means, if the plug 35 is disconnected, the interlock system 13 will detect a lack of optical energy at the detector 11, as described above, and disable the high-power optical source 15.

FIG. 4

Figure 4:
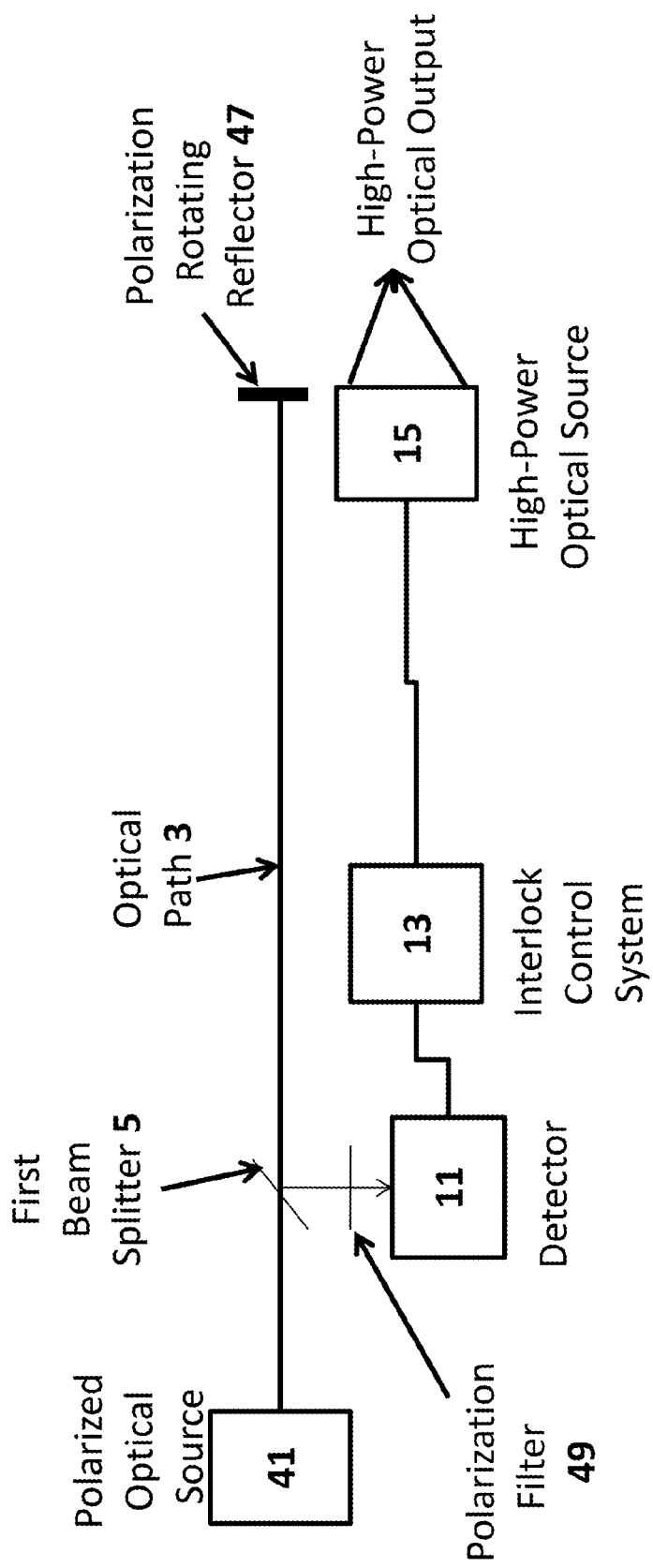
FIG. 4 depicts a general overview of one embodiment of a laser interlock system using a polarization rotating reflector as the second optical source.

FIG. 4 depicts a general overview of one embodiment of a laser interlock system using a polarization rotating reflector as the second optical source. As shown, the optical path 3, first beam splitter 5, detector 11, interlock control system 13, and high-power optical source 15 are as described above. In this embodiment, the first optical source is a polarized optical source 41, which provides an optical energy at a first polarization. The second optical source is a polarization rotating reflector 47, which rotates the optical energy at a second polarization and reflects it back to the first beam splitter 5. The first filter is a polarization filter 49, which is substantially opaque to optical energy at the first polarization and preferably also substantially opaque to optical energy having a wavelength different than optical energy from the polarizing optical source 41. The polarization filter 49 is substantially translucent to optical energy at the polarization and wavelength of the second optical source.

Polarized Optical Source 41

The polarized optical source 41 creates an optical energy having low peak power, preferably less than 10 Watts, more preferably less than about 1 Watt. Preferably, the optical energy produced by the polarized optical source 41 is a continuous stream or a periodic pulse. In the preferred embodiment, the polarizing optical source 41 is a laser diode, preferably providing a continuous optical energy that is detected by the detector.

The polarizing optical source 41 provides an optical energy at a first polarization. In a preferred embodiment, the polarizing optical source 41 comprises a polarizer, preferably an optical filter that passes optical energy of a specific polarization and blocks waves of other polarizations. Preferably, the polarized optical source 41 has a different wavelength than or the same polarization as the optical energy from the high-power optical source 15.

Polarization Filter 49

The polarization filter 49 is substantially opaque to optical energy at the first polarization. The polarization filter 49 is substantially translucent to optical energy at the second polarization. Preferably, the polarization filter 49 is also substantially opaque to optical energy having a wavelength different from the polarizing optical source 41, preferably through the use of a wavelength specific filter.

Preferably, the polarization filter 49 is a wire-grid polarizer, absorptive polarizers (e.g. using a crystal such as tourmaline), beam-splitting polarizer, polarization by reflection, birefringent polarizer, thin film polarizer other polarization device, or any combination thereof.

Polarization Rotating Reflector 47

The polarization rotating reflector 47 reflects optical energy at the first polarization to a second polarization. Preferably, the second polarization is about 90 degrees from the first polarization.

In one embodiment, the second optical source includes a waveplate and a thin film mirror designed to cause a reflection and preferably a 90 degree rotation of polarization. Preferably the waveplate is about ¼ inch thick. Preferably, the ¼ wave plate is made of Calcite, Mica, crystalline Quartz, or a combination thereof. Preferably, the mirror is made of fused quartz with a vapor deposited coating, either metallic or otherwise. Preferably, the mirror is coated with aluminum or silver for cost effectiveness.

In one embodiment, the second optical source, or a combination of the optical path and second optical source uses a plurality of mirrors which change the direction of polarization to any direction, whereby the reflect of light by each mirror produces a final result at the second optical source of a 90 degree rotation of the polarization from the optical energy produced by the first optical source.

FIG. 5

Figure 5:
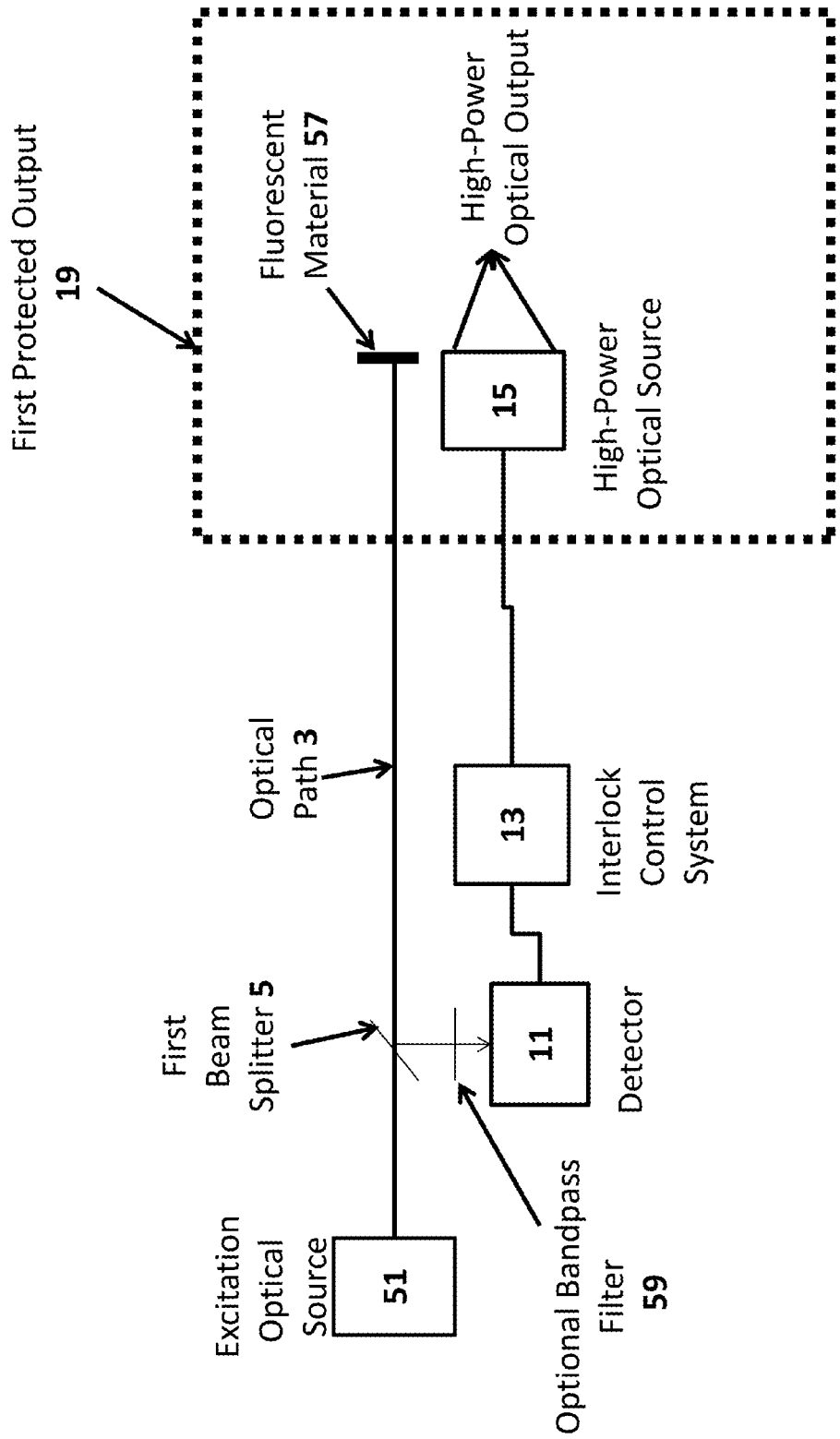
FIG. 5 depicts a general overview of one embodiment of a laser interlock system using a fluorescent material as the second optical source.

FIG. 5 depicts a general overview of one embodiment of a laser interlock system using a fluorescent material as the second optical source. As shown, the optical path 3, first beam splitter 5, detector 11, interlock control system 13, high-power optical source 15, and the first protected output 19 are as described above. In this embodiment, the first optical source is an excitation optical source 51, which provides an optical energy at a first wavelength. The second optical source is a fluorescent material 57, which is made of a material which emits optical energy in response to optical energy from the excitation optical source 51, which has a different wavelength that the optical energy from the excitation optical source 51 and the high-power-optical source 15. The first filter is a bandpass filter 59, which is substantially opaque to the optical energy from the excitation optical source 51, preferably by filtering their respective wavelengths. The bandpass filter 59 is also substantially translucent to optical energy produced by the fluorescent material 57 in response to optical energy form the excitation optical source 51. Preferably, the bandpass filter 59 is also substantially opaque to optical energy that is not substantially at the wavelength produced by the fluorescent material 57. In the alternative, the bandpass filter 59 may be omitted, for example, but not limited to, when the response of the fluorescent material 57 is modulated or otherwise distinguishable by the detector 11, interlock control system 13 or a combination thereof.

Excitation Optical Source 51

The excitation optical source 51 is any optical source capable of producing an optical response from the fluorescent material 57. Preferably, the excitation optical source 51 is an optical source as described above for the first optical source.

Fluorescent Material 57

The fluorescent material 57 is any material that produces an optical energy in response to optical energy from the excitation optical source 51. Preferably, the fluorescent material 57 is a solid state laser materials such as Nd:YAG, Cr:YAG, Nd:YVO$_4$, Nd:glass, Ruby, Alexandrite, Ti:Sapphire, Nd:YALO, Er:YAG, Yb:YAG, Er:YSGG, Nd:YLF, Er:YLF, Ho:YLF, Tm:YLF, Cr,Nd:YSGG, Cr,Er:YSGG, Cr,Ho,Tm:YSGG, Cr:Fosterite, Nd:KGW, Er:KGW, TGG, Er:YVO$_4$, Yb:YVO$_4$, Cr,Yb,Er:glass, Nd,Yb,Er:glass, Yb:glass, Er:glass, fluorite, calcite, gypsum, ruby, talc, opal, agate, quartz, amber, a substrate impregnated with a dye, a phosphorescent crystal, or combinations thereof.

FIG. 6

Figure 6:
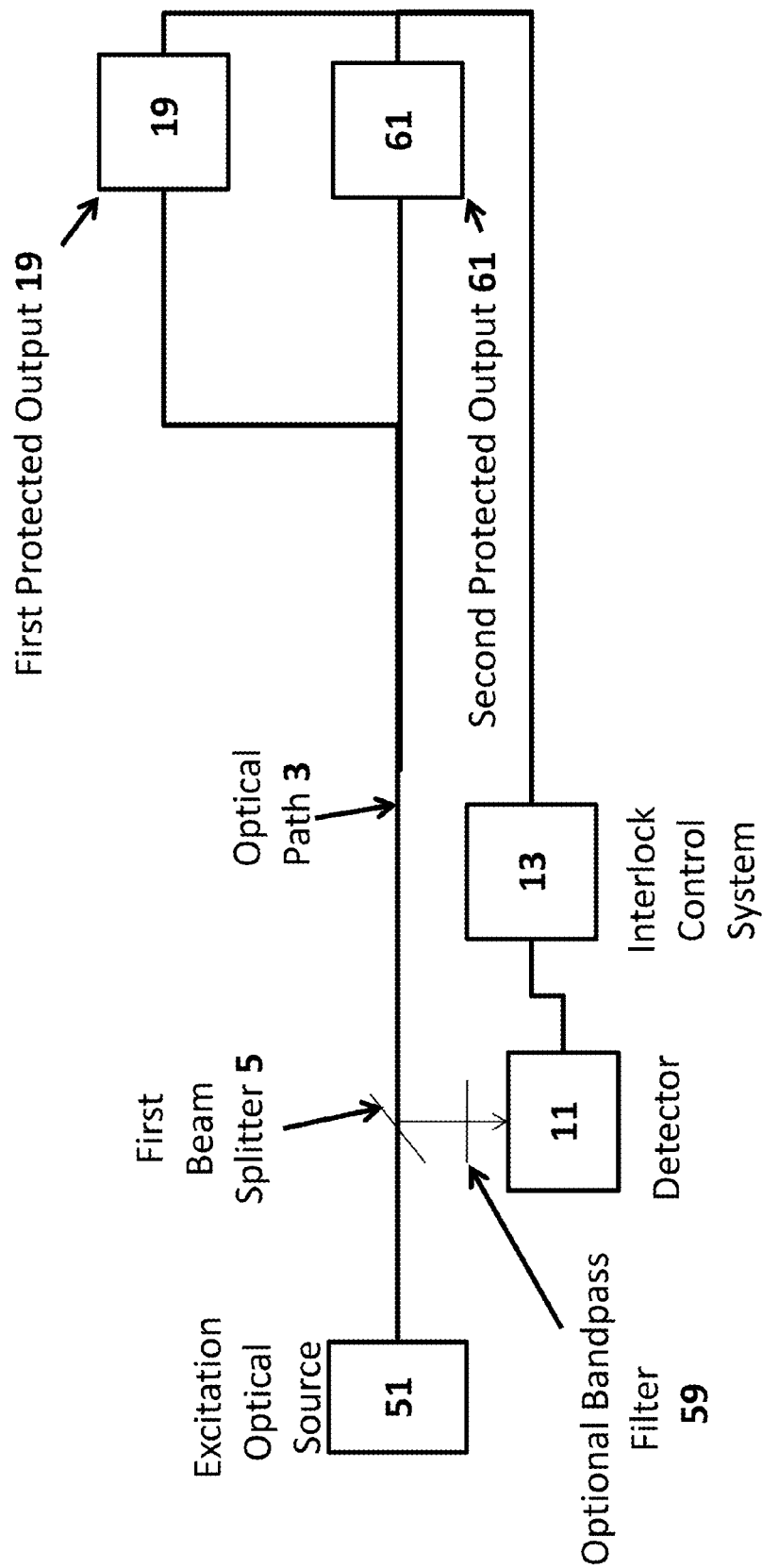
FIG. 6 depicts a general overview of one embodiment of a laser interlock system using a first protected output and a second protected output.

FIG. 6 depicts a general overview of one embodiment of a laser interlock system using a first protected output 19 and a second protected output 61. As shown, the optical path 3, first beam splitter 5, detector 11, interlock control system 13, and the first protected output 19 are as described above. This embodiment further includes a second protected output 61, which is the same as the first protected output 61, having a second optical source 7, preferably a fluorescent material 57, and a high-power optical source 15, as described above. Although only a first protected output 19 and a second protected output 61 are shown in FIG. 6, any number of protected outputs may be used.

The first protected output 19 and the second protected output 61 are connected to the first beam splitter 5 using the same optical fiber or different optical fibers. In one embodiment, the optical path 3 is split at the first beam splitter 5. In another embodiment, the optical path 3 is split after the first beam splitter 5, using a first beam splitter or other means of splitting the optical energy.

In this embodiment, the second optical source, e.g. the fluorescent material 57 shown in FIG. 5, of the first protected output 19 produces a different polarity, wavelength, or modulation or combination thereof, whereby the detector 11, the interlock control system 13, or a combination thereof is capable of distinguishing the optical energy from the first protected output 19 and the second protected output 61 received at the detector 11. This embodiment is advantageous as the excitation optical source 51, the first beam splitter 5, the detector 11, and the interlock control system 13 are used to monitor multiple points, reducing the number of components, and thereby reducing cost and complexity.

In a preferred embodiment, the first protected output 19 produces a different wavelength, preferably by having a different fluorescent material, than the wavelength produced by the second protected output 61, whereby the detector, interlock control system 13, or combination thereof includes the ability to determine the wavelength of light received, for example, but not limited to, by calculating a Fourier transformation. In an alternate embodiment, the first protected output 19 produces modulated output different (including a lack of modulation), preferably by having a second optical source, than the output produced by the second protected output 61, whereby the detector, interlock control system 13, or combination thereof includes the ability to determine the modulation (or lack thereof) of light received. In yet another alternate embodiment, the first protected output 19 produces an output having a different polarity, preferably by having a second optical source, than the output produced by the second protected output 61, whereby the detector, interlock control system 13, or combination thereof includes the ability to determine the polarity of light received, for example, but not limited to, using a second detector optically connected to the first beam splitter 5 and polarization filters blocking different polarizations reaching the first and second detectors.

FIG. 7

Figure 7:
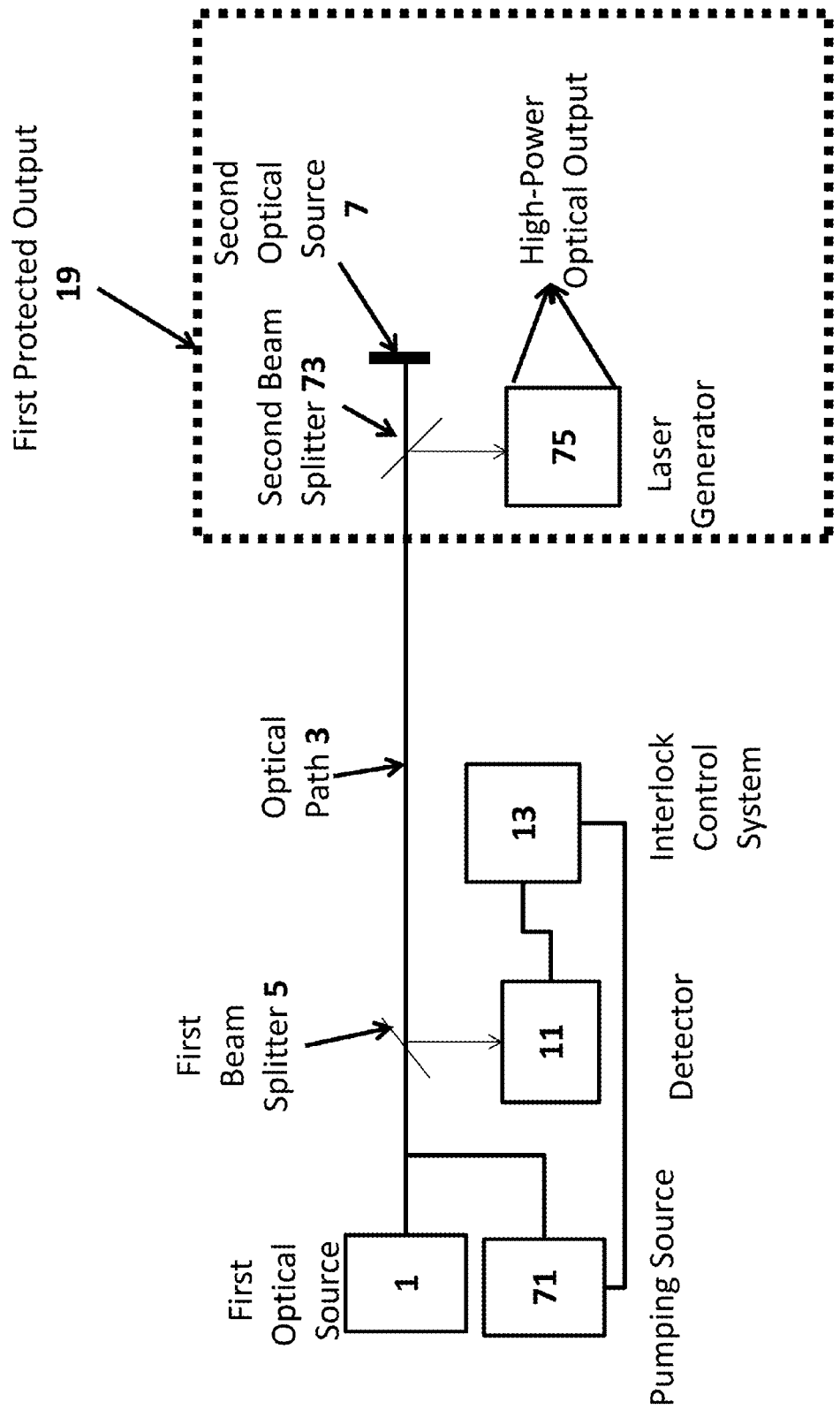
FIG. 7 depicts a general overview of one embodiment of a laser interlock system having a first optical source and a pumping source using the same optical path.

FIG. 7 depicts a general overview of one embodiment of a laser interlock system having a first optical source and a pumping source using the same optical path. As shown, the first optical source 1, optical path 3, first beam splitter 5, second optical source 7, detector 11, interlock control system 13, and the first protected output 19 are as described above. This embodiment further includes a pumping source 71, a second beam splitter 73, and a Laser Light Generator 75.

As shown the pumping source 71 is optically connected to the optical path 3, preferably using the same optical components as the optical energy from the first optical source 1. In the embodiment shown in FIG. 7, the pumping source 71 is optically connected to the optical path 3 before the first beam splitter 5, although this optical connect may occur anywhere along the optical path 3. The first optical source 1 and the pumping source 71 may be connected to the optical path 3 using any optical coupling means, for example, any number of lenses, reflectors, and combinations thereof. In a preferred embodiment, a beam splitter, as described above is used to optically connect the first optical source 1 and the pumping source 71 along the optical path 3. In one embodiment, the optical path 3 is split at the first beam splitter 5. In another embodiment, the optical path 3 is split after the first beam splitter 5, using a first beam splitter or other means of splitting the optical energy.

This embodiment, having a first optical source 1 and a second pumping source 71 is preferable over having a single optical source as having a separate first optical source allows for a more continuous monitoring not affecting or bound by the pumping cycle of the Laser Light Generator 75 and the pumping source 71. This embodiment is also preferable as it also minimizes the release of high-power optical energy, as depending on the excitation of the Laser Light Generator and its configuration, the media may be only one pump pulse away from lasing, for example for a nearly saturated passively Q-switched Laser Light Generator media.

Pumping Source 71

The pumping source 71 is as described for the first optical source above that is preferably optimized for the excitation of the optically connected Laser Light Generator 75. Although the pumping source 71 is shown as being inserted before the first beam splitter 5, the pumping source 71 may alternately be inserted anywhere along the optical path 3, for example after the first beam splitter 5.

First Beam Splitter 5 and Second Beam Splitter 73

The second beam splitter 73 is as described above for the first beam splitter 5, but is also preferably optimized for handling both the optical energy from the pumping source 71 and the optical energy from the first optical source 1. The second beam splitter 73 optically connects the second optical source 7 and the Laser Light Generator 75 to the optical energy passing through the optical path 3 from the first Optical source 1 and the Pumping Source 71.

In one embodiment, the first beam splitter 5, the second beam splitter 73, or a combination thereof is a dichroic beam splitter, whereby the beam splitter will efficiently separate the optical energy from the first optical source 1 and the pumping source 71.

Laser Light Generator 75

The Laser Light Generator 75 produces a lasing energy in response to optical energy form the first optical source 1, the pumping source 71 or a combination thereof. The Laser Light Generator 75 is preferably a Passively Q-switched laser comprising a laser media adjacent to a Q-switch positioned between a high-reflectivity mirror and an optical coupler, for example as described in U.S. Pat. No. 7,421,166, hereby fully incorporated by reference. The laser media is preferably made of one of the plurality of materials as discussed in Koechner, W., Bass, M., "Solid-State Lasers: A Graduate Text" Springer, New York 2003, hereby fully incorporated by reference. The laser media is preferably a doped host material, preferably Glasses, crystals such as Oxides, Garnets, Vanadates, and Fluorides, and ceramics. The Glasses are preferably doped with Nd, Er, or Yb. The Oxides such as sapphire is preferably doped with Ti. The Garnets are Yttrium Aluminum Garnet $Y_3Al_5O_{12}$ (YAG), Gadolinium Gallium Garnet $Gd_3Ga_5O_{12}$ (GGG), and Gadolinium Scandium Aluminum Garnet $Gd_3Sc_2Al_3O_{12}$ (GSGG) and are preferably doped with rare earths such as Nd, Tm, Er, Ho, Yb. The Vanadates or Yttrium Orthovanadate ($YVO_4$) is preferably doped with Nd. The Fluorides or Yttrium Fluoride ($YLiF_4$) and is preferably doped with Nd. The laser media 75 is preferably Nd:YAG (neodymium-doped yttrium aluminium garnet), Nd:Glass (neodymium-doped glass), Nd:YLF(neodymium-doped yttrium lithium fluoride), Nd:$YVO_4$ (Yttrium Vanadate), Er:Glass (Erbium doped glass), Yb:YAG (ytterbium-doped yttrium aluminium garnet), Alexandrite, Ti:Sapphire (Titanium-sapphire). In the preferred embodiment the laser media is Nd:YAG having about 0.5% atomic weight of Nd, which will emit lasing power at about 1064 nm. The dopant level of the laser media is intentionally low to improve the performance of the laser. Lowering the dopant concentration affects the overall output by modifying the beam overlap, the absorption depth of the optical pumping energy, reducing thermal lensing losses, and reducing losses due to ASE (Amplified Spontaneous Emission). This leads to a much more uniform pumped gain profile as well as more uniformly distributed thermal stresses which lessen the effects of thermal lensing. The reduction of dopant concentration lowers the gain of the material slightly but offers larger energy storage capacity in return. The lasing power produced by the laser media has a peak power greater than the optical energy from the pumping source 71. Peak power is the maximum energy produced by a generation facility over a fixed period of time.

FIG. 8

Figure 8:
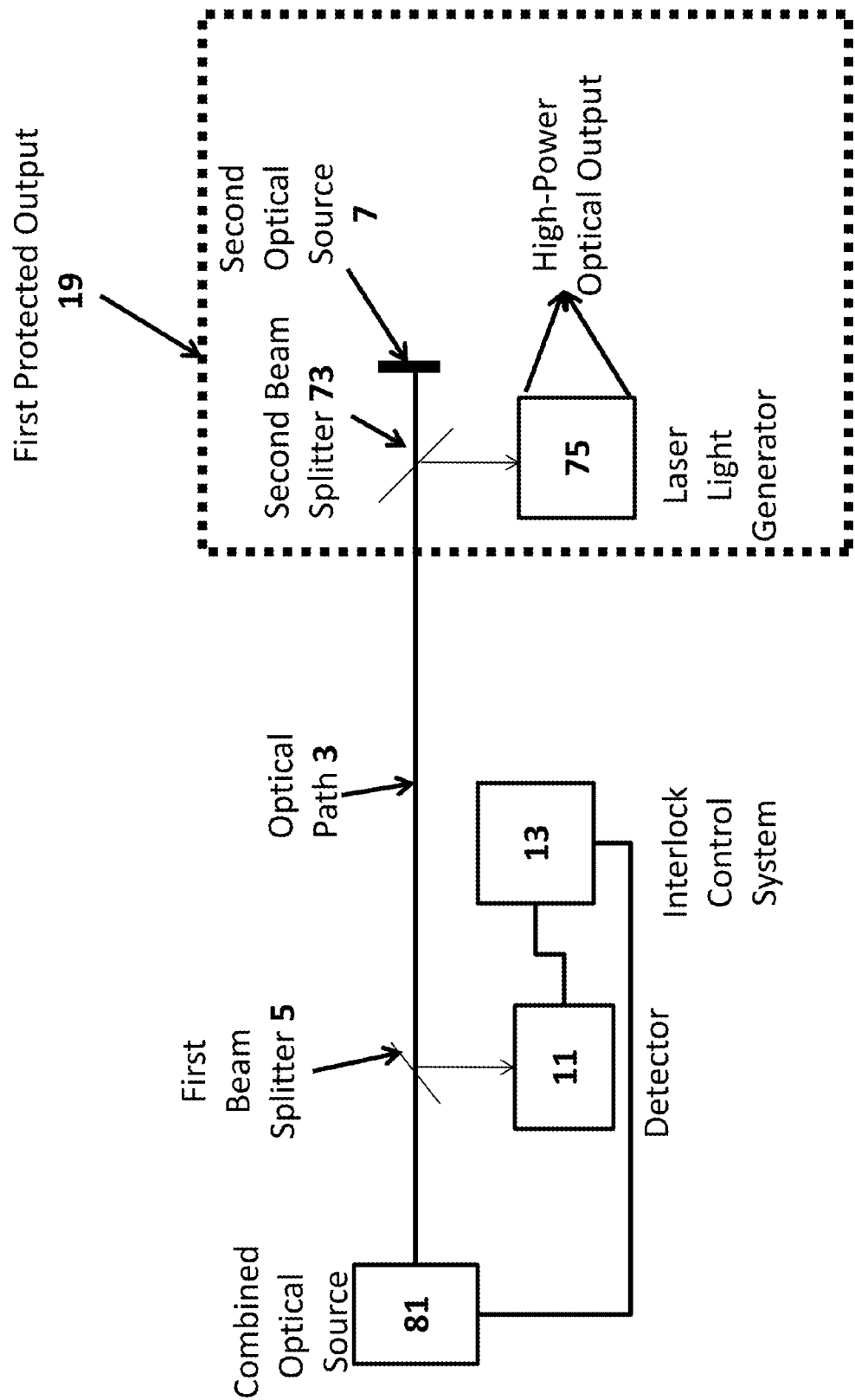
FIG. 8 depicts a general overview of one embodiment of a laser interlock system having a single optical source operating as a first optical source for monitoring and also as a pumping source for a laser media.

FIG. 8 depicts a general overview of one embodiment of a laser interlock system having a single optical source operating as a first optical source for monitoring and also as a pumping source for a laser media. As shown, optical path 3, first beam splitter 5, second optical source 7, detector 11, interlock control system 13, first protected output 19, second beam splitter 73, and a laser media 75 are as described above. This embodiment is the same as FIG. 7, except that the optical energy from the combined optical source 81 provides the optical energy produced by the first optical source 1 and the pumping source 71 as described above. Therefore the combined optical source 81 provides optical energy both to pump the Laser Light Generator 75, as well as provide optical energy to the second optical source 7 as described above.

FIG. 9

FIG. 9 depicts a general overview of one embodiment of a laser interlock system having a single optical source operating as a first optical source for monitoring and also as a pumping source for a laser media, and a Laser Light Generator serving as both the second optical source and the high-power optical output. As shown, combined optical source 81, optical path 3, first beam splitter 5, second optical source 7, detector 11, interlock control system 13, first protected output 19, second beam splitter 73, and a laser media 75 are as described above. This embodiment is the same as FIG. 8, with the exception that the second beam splitter 73, the second optical source 7, and the Laser Light Generator 75 are replaced with a reflective Laser Light Generator 91. In this embodiment, the Laser Light Generator 91 serves as both the second optical source 7 and Laser Light Generator 75 as described above.

In one embodiment, when the optical energy from the combined optical source 81 excites the laser media in the Laser Light Generator 91, thereby causing lasing, a small portion of the lasing energy will pass through the high reflector at the back of the laser and will travel back through the optical path 3. This lasing energy will be at the wavelength of the laser in the Laser Light Generator 91, different from the wavelength of optical energy from the combined optical source 81, and can therefore be separated or distinguished by a filter, the detector 11, interlock control system 13, or a combination thereof, as described above. Preferably, a filter as described above, more preferably a dichroic filter is used to filter the lasing energy from reaching the detector 11. It is preferable to have at least a separate optical source 7, more preferably additionally a separate first optical source, as the embodiment described in FIG. 9 will produce a dangerous pulse before it can be terminated as described herein. However, this embodiment would be advantageous to monitor the optical path 3 to the first protected output 19 in a low cost, efficient manner.

FIG. 10

Figure 10:
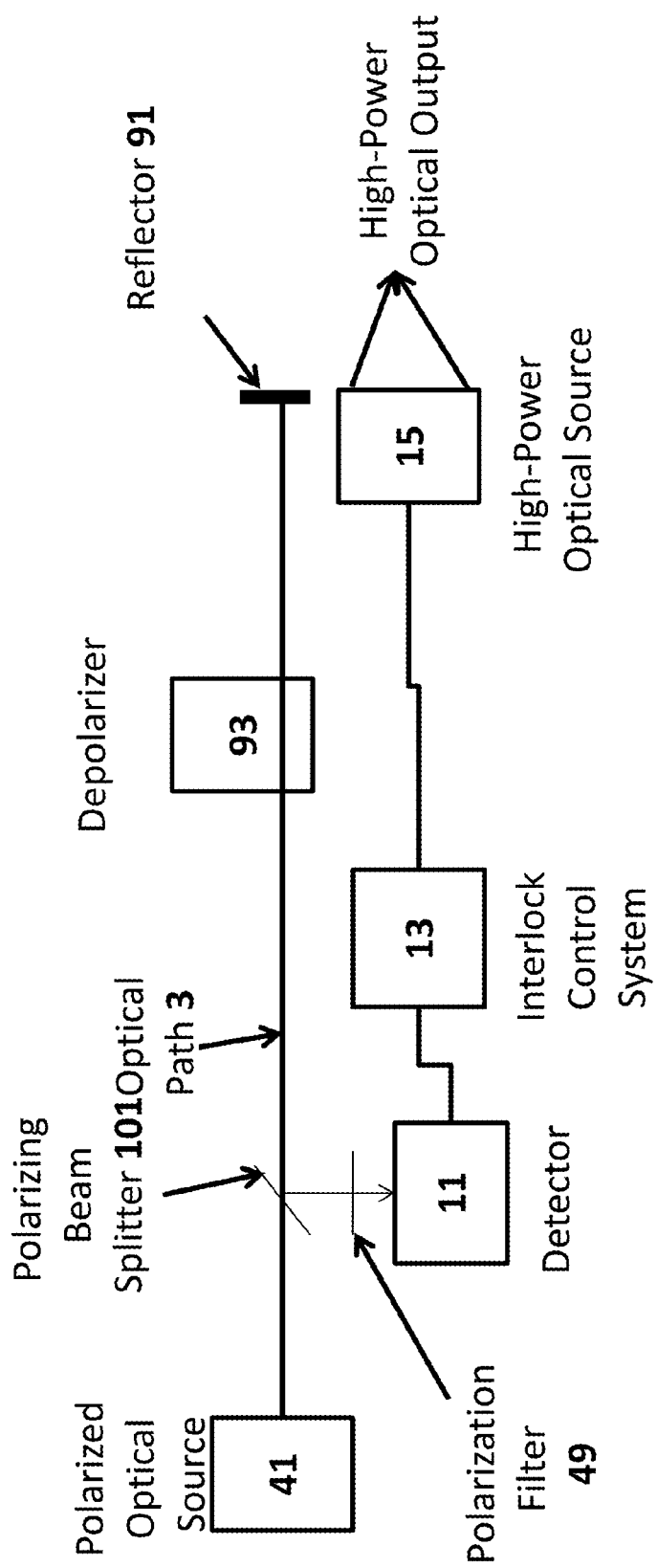
FIG. 10 depicts a general overview of one embodiment of a laser interlock system using a depolarizer.

FIG. 10 depicts a general overview of one embodiment of a laser interlock system using a depolarizing optical fiber. As shown, the polarized optical source 41, optical path 3, detector 11, interlock control system 13, and high-power optical source 15 are as described above. In this embodiment, the first optical source is a polarized optical source 41, which provides an optical energy at a first polarization. The First Beam Splitter, as described above, is a polarizing beam splitter 101 which transmits optical energy polarized in the direction of Polarized Optical Source 41 and reflects optical energy polarized in directions other than in the direction of Polarized Optical Source 41. The Depolarizer 93 is an optical means to scramble the polarization of optical energy passing through it. The second optical source is a reflector 91, which is as described above for the polarization rotating reflector except that it does not necessarily need to rotate the polarization of the optical energy. The first filter is a polarization filter 49, which is substantially opaque to optical energy at the first polarization and preferably also substantially opaque to optical energy having a wavelength different than optical energy from the polarizing optical source 41.

Depolarizer 93

The depolarizer 93 is any optical means of depolarizing light. The depolarizer 93 is preferably a birefringent filter. A birefringent filter is a material which rotates polarized light in either an ordered or random fashion producing light which is not the same polarization as that which entered it. In an alternate embodiment the depolarizer 93 is preferably a multimode optical fiber of sufficient length to depolarize the optical energy from the polarizing optical light source 41.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A device for providing laser interlock comprising:
    a) a first optical source, a first beam splitter, a second optical source, a detector, an interlock control system, and a means for producing dangerous optical energy within a first protected output;
    b) said means for producing dangerous optical energy within a first protected output and said second optical source positioned with said first protected output;
    c) said first beam splitter optically connected to said first optical source, said detector, and said second optical source;
    d) said detector connected to said interlock control system;
    e) said second optical source configured to produce an optical energy in response to optical energy from said first optical source;
    f) the optical energy of said second optical source having a different wavelength, polarization, modulation or combination thereof from the optical energy of said first optical source;
    g) at least said second optical source within said first protected output;
    h) said interlock control system connected to said high-power optical source and configured to terminate optical energy emission from said means for producing dangerous optical energy upon the detection of optical energy at said detector from said second optical source below a predetermined detector threshold;
    i. an optical window connected to said second optical source and said means for producing dangerous optical energy; and whereby j. said second optical source is a coating on or is embedded on said optical window.

2. A device for providing laser interlock comprising:
   a) a first optical source, a first beam splitter, a second optical source, a detector, an interlock control system, and a means for producing dangerous optical energy within a first protected output;
   b) said means for producing dangerous optical energy within a first protected output and said second optical source positioned with said first protected output;
   c) said first beam splitter optically connected to said first optical source, said detector, and said second optical source;
   d) said detector connected to said interlock control system;
   e) said second optical source configured to produce an optical energy in response to optical energy from said first optical source;
   f) the optical energy of said second optical source having a different wavelength, polarization, modulation or combination thereof from the optical energy of said first optical source;
   g) at least said second optical source within said first protected output;
   h) said interlock control system connected to said high-power optical source and configured to terminate optical energy emission from said means for producing dangerous optical energy upon the detection of optical energy at said detector from said second optical source below a predetermined detector threshold;
   i. a first section comprising said means for producing dangerous optical energy;
   j. a second section comprising said second optical source; and
   k. a means for removably fastening said first section to said second section.

3. The device for providing laser interlock of claim 2 whereby:
   a) said first section further comprises a plug;
   b) said plug of said first section further comprises a means for allowing for the passage of said optical path within said first section;
   c) said plug of said first section further comprises a means for allowing any connections between said interlock control system and said means for producing dangerous optical energy;
   d) said second section further comprises said optical window; and
   e) said second section forms a sealed chamber.

4. A device for providing laser interlock comprising:
   a) a first optical source, a first beam splitter, a second optical source, a detector, an interlock control system, and a means for producing dangerous optical energy within a first protected output;
   b) said means for producing dangerous optical energy within a first protected output and said second optical source positioned with said first protected output;
   c) said first beam splitter optically connected to said first optical source, said detector, and said second optical source;
   d) said detector connected to said interlock control system;
   e) said second optical source configured to produce an optical energy in response to optical energy from said first optical source;
   f) the optical energy of said second optical source having a different wavelength, polarization, modulation or combination thereof from the optical energy of said first optical source;
   g) at least said second optical source within said first protected output;
   h) said interlock control system connected to said high-power optical source and configured to terminate optical energy emission from said means for producing dangerous optical energy upon the detection of optical energy at said detector from said second optical source below a predetermined detector threshold;
   i. a first filter;
   j. said first filter optically connected to and optically positioned between said first beam splitter and said detector; and
   k. said first filter substantially opaque to the optical energy from said first optical source and substantially translucent to the optical energy from said second optical source.

5. The device for providing laser interlock of claim 4 further comprising:
   a) said first filter substantially opaque to optical energy at the polarization of optical energy from said first optical source;
   b) said first filter substantially translucent to optical energy at the polarization of optical energy from the second optical source; and
   c) said second optical source comprises a second optical source reflecting optical energy at different polarization.

6. The device for providing laser interlock of claim 5 further comprising:
   a) an optical window connected to said second optical source and said means for producing dangerous optical energy;
   b) a first section comprising said means for producing dangerous optical energy;
   c) a second section comprising said second optical source; and
   d) a means for removably fastening said first section to said second section.

7. The device for providing laser interlock of claim 6 whereby:
   a) said first filter is substantially opaque to the optical energy from said high-energy optical source;
   b) said first section further comprises a plug;
   c) said plug of said first section further comprises a means for allowing for the passage of said optical path within said first section;
   d) said plug of said first section further comprises a means for allowing any connections between said interlock control system and said means for producing dangerous optical energy;
   e) said second section further comprises said optical window; and
   f) said second section forms a sealed chamber.

8. The device for providing laser interlock of claim 7 further comprising:
   a) an optical window connected to said second optical source and said means for producing dangerous optical energy; and whereby
   b) said second optical source is a coating on or is embedded on said optical window.

9. The device for providing laser interlock of claim 4 further comprising:
   a) said first filter substantially opaque to optical energy at the wavelength of optical energy from said first optical source;

b) said first filter substantially translucent to optical energy at the wavelength of optical energy from said second optical source in response to optical energy of said first optical source; and c) said second optical source comprises a material which emits optical energy in response to optical energy from said first optical source at a wavelength different from the optical energy of said first optical source.

10. The device for providing laser interlock of claim 9 further comprising:
   a) an optical window connected to said second optical source and said means for producing dangerous optical energy;
   b) a first section comprising said means for producing dangerous optical energy;
   c) a second section comprising said second optical source; and
   d) a means for removably fastening said first section to said second section.

11. The device for providing laser interlock of claim 10 whereby:
   a) said first filter is substantially opaque to the optical energy from said high-energy optical source;
   b) said first section further comprises a plug;
   c) said plug of said first section further comprises a means for allowing for the passage of said optical path within said first section;
   d) said plug of said first section further comprises a means for allowing any connections between said interlock control system and said means for producing dangerous optical energy;
   e) said second section further comprises said optical window; and
   f) said second section forms a sealed chamber.

12. The device for providing laser interlock of claim 11 further comprising:
   a) said first optical source producing an optical energy at a different wavelength than optical energy produced by said means for producing dangerous optical energy.

13. The device for providing laser interlock of claim 12 further comprising:
   a) a second protected output comprising a corresponding second optical source and a corresponding means for producing dangerous optical energy; and whereby
   b) said second optical source of said second protected output produces an optical energy with a wavelength different from said second optical source of said first protected output.

14. The device for providing laser interlock of claim 13 further comprising:
   a) an optical window connected to said second optical source and said means for producing dangerous optical energy; and whereby
   b) said second optical source is a coating on or is embedded on said optical window.

15. A device for providing laser interlock comprising:
   a) a first optical source, a first beam splitter, a second optical source, a detector, an interlock control system, and a means for producing dangerous optical energy within a first protected output;
   b) said means for producing dangerous optical energy within a first protected output and said second optical source positioned with said first protected output;
   c) said first beam splitter optically connected to said first optical source, said detector, and said second optical source;
   d) said detector connected to said interlock control system;
   e) said second optical source configured to produce an optical energy in response to optical energy from said first optical source;
   f) the optical energy of said second optical source having a different wavelength, polarization, modulation or combination thereof from the optical energy of said first optical source;
   g) at least said second optical source within said first protected output;
   h) said interlock control system connected to said high-power optical source and configured to terminate optical energy emission from said means for producing dangerous optical energy upon the detection of optical energy at said detector from said second optical source below a predetermined detector threshold;
   i. a second protected output comprising a corresponding second optical source and a corresponding means for producing dangerous optical energy; and whereby
   j. said second optical source of said second protected output produces an optical energy with a polarity, wavelength, or modulation or combination thereof different from said second optical source of said first protected output.

16. A device for providing laser interlock comprising:
   a) a first optical source, a first beam splitter, a second optical source, a detector, an interlock control system, and a means for producing dangerous optical energy within a first protected output;
   b) said means for producing dangerous optical energy within a first protected output and said second optical source positioned with said first protected output;
   c) said first beam splitter optically connected to said first optical source, said detector, and said second optical source;
   d) said detector connected to said interlock control system;
   e) said second optical source configured to produce an optical energy in response to optical energy from said first optical source;
   f) the optical energy of said second optical source having a different wavelength, polarization, modulation or combination thereof from the optical energy of said first optical source;
   g) at least said second optical source within said first protected output;
   h) said interlock control system connected to said high-power optical source and configured to terminate optical energy emission from said means for producing dangerous optical energy upon the detection of optical energy at said detector from said second optical source below a predetermined detector threshold;
   i. said second optical source produces a modulated optical emission.

17. The device for providing laser interlock of claim 16 further comprising:
   a) a second protected output comprising a corresponding second optical source and a corresponding means for producing dangerous optical energy; and whereby
   b) said second optical source of said second protected output produces an optical energy with a modulation different from said second optical source of said first protected output.

18. The device for providing laser interlock of claim 17 further comprising:
   a) said first protected output further comprising an optical window connected to said second optical source of said first protected output and said high-power optical source of said first optical output; and whereby b) said second optical source of said first optical output is a coating on or is embedded on said optical window of said first optical output;
c) said second protected output further comprising an optical window connected to said second optical source of said second protected output and said high-power optical source of said first optical output; and whereby
d) said second optical source of said first optical output is a coating on or is embedded on said optical window of said first optical output.

* * * * *